(12) United States Patent
Denoue et al.

(10) Patent No.: US 11,343,445 B2
(45) Date of Patent: May 24, 2022

(54) SYSTEMS AND METHODS FOR IMPLEMENTING PERSONAL CAMERA THAT ADAPTS TO ITS SURROUNDINGS, BOTH CO-LOCATED AND REMOTE

(71) Applicant: FUJIFILM Business Innovation Corp., Tokyo (JP)

(72) Inventors: Laurent Denoue, Verona (IT); Scott Carter, Menlo Park, CA (US); Chelhwon Kim, Palo Alto, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/027,504

(22) Filed: Sep. 21, 2020

(65) Prior Publication Data

US 2021/0006731 A1    Jan. 7, 2021

Related U.S. Application Data

(62) Division of application No. 16/214,041, filed on Dec. 8, 2018, now Pat. No. 10,785,421.

(51) Int. Cl.
*H04N 5/262* (2006.01)
*H04N 5/222* (2006.01)
(Continued)

(52) U.S. Cl.
CPC .......... *H04N 5/2621* (2013.01); *G06T 7/194* (2017.01); *G06V 20/46* (2022.01); *G06V 40/161* (2022.01);
(Continued)

(58) Field of Classification Search
CPC ...... G06K 9/40; G06K 9/346; G06K 9/00234; G06K 9/3241; G06K 9/00624; G06T 7/73;
(Continued)

(56) References Cited

U.S. PATENT DOCUMENTS 5,812,787 A    9/1998 Astle
7,227,567 B1 *  6/2007 Beck ...................... H04N 7/147
                                              348/14.01
(Continued)

OTHER PUBLICATIONS

S. Watanabe and M. Hasegawa, "Reflection Removal on Eyeglasses Using Deep Learning," 2021 36th International Technical Conference on Circuits/Systems, Computers and Communications (ITC-CSCC), 2021, pp. 1-4, doi: 10.1109/ITC-CSCC52171.2021.9501489. (Year: 2021).*

(Continued)

*Primary Examiner* — Timothy J Henn
(74) *Attorney, Agent, or Firm* — Procopio, Cory, Hargreaves & Savitch LLP

(57) ABSTRACT

A computerized system comprising a processing unit and a memory, the system operating in connection with a real-time video conference stream containing a video of a user, wherein the memory embodies a set of computer-executable instructions, which cause the computerized system to perform a method involving: receiving the real time video conference stream containing the video of the user; detecting and separating the background in the received real time video conference stream from the user; and replacing the separated background with a background received from a system of a second user or with a pre-recorded background.

9 Claims, 12 Drawing Sheets

(51) Int. Cl.
| | |
|---|---|
| *G06K 9/00* | (2022.01) |
| *H04N 7/15* | (2006.01) |
| *H04N 5/232* | (2006.01) |
| *G06T 7/194* | (2017.01) |
| *G06V 20/40* | (2022.01) |
| *G06V 40/16* | (2022.01) |

(52) U.S. Cl.
CPC ......... *G06V 40/172* (2022.01); *H04N 5/2224* (2013.01); *H04N 5/23219* (2013.01); *H04N 7/152* (2013.01)

(58) Field of Classification Search
CPC .. G06T 5/00; G06T 5/003; G06T 7/10; G06T 2207/20012; G06T 2207/10024; G06T 2207/10028; H04N 5/23229; H04N 5/23219; H04N 5/23248
See application file for complete search history.

(56) References Cited

U.S. PATENT DOCUMENTS

| | | | |
|---|---|---|---|
| 7,783,075 | B2 | 8/2010 | Zhang et al. |
| 8,665,309 | B2 | 3/2014 | Ferren |
| 9,313,454 | B2 | 4/2016 | Lalonde et al. |
| 10,785,421 | B2 | 9/2020 | Denoue et al. |
| 2008/0300010 | A1 | 12/2008 | Border et al. |
| 2011/0025819 | A1 | 2/2011 | Gorzynski et al. |
| 2012/0026277 | A1 | 2/2012 | Malzbender et al. |
| 2012/0147121 | A1 | 6/2012 | Erb et al. |
| 2013/0141519 | A1* | 6/2013 | Sayeed ................ H04N 7/142 348/14.08 |
| 2014/0379351 | A1 | 12/2014 | Raniwala |
| 2016/0155009 | A1 | 6/2016 | Han |
| 2017/0019633 | A1 | 1/2017 | Shaburov et al. |
| 2017/0142371 | A1 | 5/2017 | Barzuza et al. |
| 2019/0042871 | A1* | 2/2019 | Pogorelik .......... H04N 5/23229 |
| 2019/0102872 | A1* | 4/2019 | Moussa ..................... G06F 3/01 |
| 2019/0172238 | A1 | 6/2019 | Miao et al. |
| 2019/0180490 | A1 | 6/2019 | Zatepyakin et al. |

OTHER PUBLICATIONS

Fan, Q., et al., A Generic Deep Architecture for Single Image Reflection Removal and Image Smoothing, ICCV'17, J017, 30 pgs.

Fussell, S.R., et al., Coordination of Communication: Effects of Shared Visual Context on Collaborative Work, CSCW '00 Proceedings of the 2000 ACM Conference on Computer Supported Cooperative Work, 2000, pp. 21-30.

Isola, P., et al., Image-to-Image Translation with Conditional Adversarial Networks, 2017 IEEE Conference on ComputerVision and Pattern Recognition, 2017, 17 pgs.

Kauff, P., et al., An Immersive 3D Video-Conferencing System Using Shared Virtual Team User Environments, CVE'02, Sep. 30-Oct. 2, 2002, Bonn, Germany, 9 pgs.

Radford, A., et al., Unsupervised Representation Learning with Deep Convolutional Generative Adversarial Networks, 2015, arXiv:1511.06434, 16 pgs.

Song, S., et al., Im2Pano3D: Extrapolating 360° Structure and Semantics Beyond the Field of View, IEEE/CVF Conference on ComputerVision and Pattern Recognition, 2017, 18 pgs.

Jithub.com, justadudewhohacks/face-api, 15 pgs., retrieved Dec. 3, 2019, URL: hllps://github.com/justadudewhohacks/faceapi.js.

Jithub.com, jeelizFaceFilter, 14 pgs., retrieved Dec. 3, 2019, URL: hllps://github.com/jeeliz/jeelizFaceFilter.

* cited by examiner

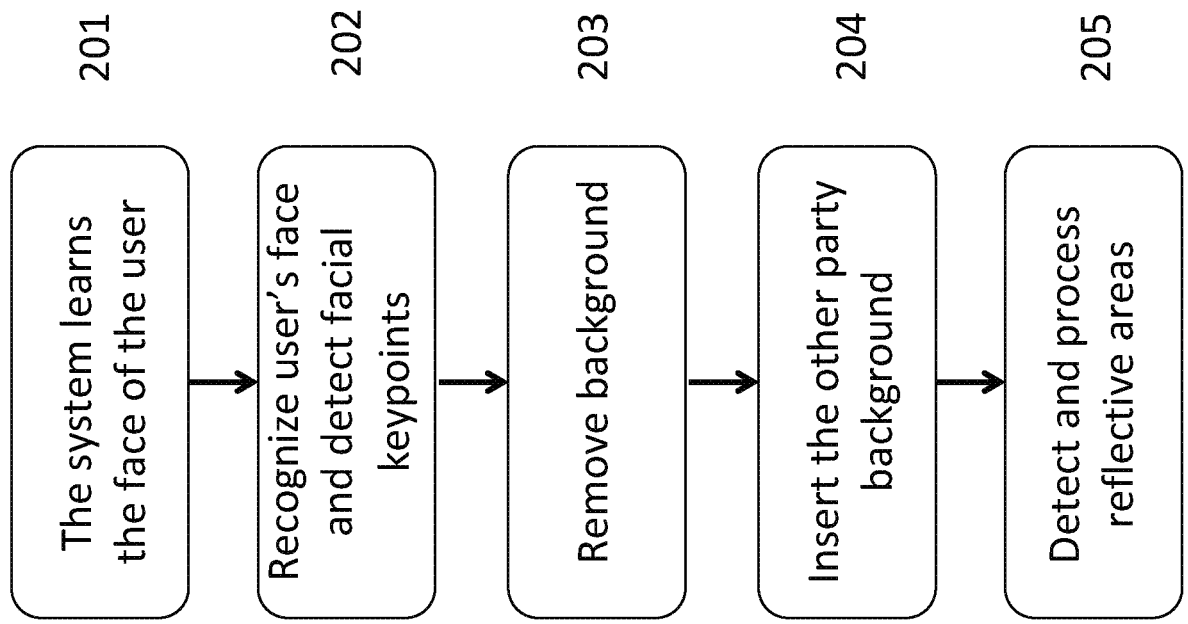

SYSTEMS AND METHODS FOR IMPLEMENTING PERSONAL CAMERA THAT ADAPTS TO ITS SURROUNDINGS, BOTH CO-LOCATED AND REMOTE

CROSS-REFERENCE TO RELATED APPLICATIONS

This application is a Divisional Application of U.S. application Ser. No. 16/214,041 filed Dec. 8, 2018, the contents of which are incorporated herein by reference.

BACKGROUND OF THE INVENTION

Technical Field

The disclosed embodiments relate in general to smart camera systems and, more specifically, to systems and methods for implementing personal "chameleon" smart camera that adapts to its surroundings, both co-located and remote.

Description of the Related Art

As would be appreciated by persons of ordinary skill in the art, despite the recent work on smart spaces, nowadays a lot of knowledge work happens outside of the traditional office environment: in places such as home, in cafe/restaurants (see FIG. 1d), travelling by train (see FIGS. 1a and 1c) or by bus (FIG. 1b) and in open office cubicles.

As would be also appreciated by persons of ordinary skill in the art, conducting web conferences in these public spaces is problematic: video background and reflective areas in the video (e.g., eye-glasses) can contain private and/or sensitive information, which may be inadvertently reveled to unauthorized persons and the audio channel may be suddenly cluttered with undesired ambient voices, sounds and noises, such as a barista in a restaurant calling person's name or a loud sound of a passing train. Furthermore, past work has shown that a lack of shared visual context in video conferences can impair conversational grounding for the participants, resulting in a poor user experience.

Therefore, in view of the above and other shortcomings of the conventional technology, new and improved systems and methods are needed that would implement a smart camera that adapts to its surroundings, both co-located and remote. Such inventive camera would have many uses, including video conferencing when the participants are located outside of the traditional office environment.

SUMMARY OF THE INVENTION

The embodiments described herein are directed to systems and methods that substantially obviate one or more of the above and other problems associated with the conventional smart camera systems.

In accordance with one aspect of the embodiments described herein, there is provided a computerized system incorporating a processing unit and a memory, the system operating in connection with a real-time video conference stream containing a video of a user, wherein the memory embodies a set of computer-executable instructions, which cause the computerized system to perform a method involving: receiving the real time video conference stream containing the video of the user; detecting and separating the background in the received real time video conference stream from the user; and replacing the separated background with a background received from a system of a second user or with a pre-recorded background.

In one or more embodiments, the background is a pre-recorded background retrieved from a database.

In one or more embodiments, the background is automatically generated.

In one or more embodiments, the background is recorded by the second user in response to a prompt by the system of the second user.

In one or more embodiments, the detecting and separating the background in the real time video conference stream comprises detecting a face of the user.

In one or more embodiments, the face of the user is detected by identifying a plurality of feature points in video frames of the real time video conference stream.

In one or more embodiments, wherein the method further comprises learning the face of the user.

In one or more embodiments, the face of the user is learned at the commencement of a video conference.

In one or more embodiments, the face of the user is learned in advance of the video conference.

In one or more embodiments, the separating the background in the real time video conference stream comprises identifying the user based on the learned face of the user and separating the background from the identified user.

In accordance with another aspect of the embodiments described herein, there is provided a computerized system incorporating a processing unit and a memory, the system operating in connection with a real-time video conference stream containing a video of a user, wherein the memory embodies a set of computer-executable instructions, which cause the computerized system to perform a method involving: receiving the real time video conference stream containing the video of the user; finding and separating a reflection in the received real time video conference stream; and modifying the separated reflection in the received real time video conference stream.

In one or more embodiments, the modifying the separated reflection comprises darkening the separated reflection.

In one or more embodiments, the separated reflection is eye glasses of the user.

In one or more embodiments, the modifying the separated reflection comprises replacing the separated reflection with a new reflection using a video conference stream of a second user.

In accordance with another aspect of the embodiments described herein, there is provided a computer-implemented method performed in connection with a computerized system incorporating a processing unit and a memory, the system operating in connection with a real-time video conference stream containing a video of a user, the method involving: receiving the real time video conference stream containing the video of the user; detecting and separating the background in the received real time video conference stream from the user; and replacing the separated background with a background received from a system of a second user or with a pre-recorded background.

In one or more embodiments, the background is a pre-recorded background retrieved from a database.

In one or more embodiments, the background is automatically generated.

In one or more embodiments, the background is recorded by the second user in response to a prompt by the system of the second user.

In one or more embodiments, the detecting and separating the background in the real time video conference stream comprises detecting a face of the user.

In one or more embodiments, the face of the user is detected by identifying a plurality of feature points in video frames of the real time video conference stream.

In one or more embodiments, wherein the method further comprises learning the face of the user.

In one or more embodiments, the face of the user is learned at the commencement of a video conference.

In one or more embodiments, the face of the user is learned in advance of the video conference.

In one or more embodiments, the separating the background in the real time video conference stream comprises identifying the user based on the learned face of the user and separating the background from the identified user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 illustrates an exemplary operating sequence of an embodiment of the inventive "chameleon" smart camera that adapts to its surroundings, both co-located and remote.

DETAILED DESCRIPTION

Figure 1A:
FIGS. 1a, 1b, 1c and 1d illustrate certain examples of knowledge work in the wild: bus (FIG. 1b), train (FIGS. 1a and 1c) and cafe (FIG. 1d).
Figure 1B:
Figure 1C:
Figure 1D:

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Despite recent work on smart spaces, nowadays a large amount of knowledge work happens in the wild (outside of the traditional office environment): at home, in coffee places, trains, buses, planes, and of course in crowded open office cubicles, see FIGS. 1a, 1b, 1c and 1d. Conducting web conferences in the wild is problematic: video background and reflective areas in the video (e.g., eye-glasses) can contain private and/or sensitive intellectual property and objects that the user wishes not to stream (e.g., a barista serving his coffee, passersby moving), and the audio channel can be suddenly cluttered with undesired voices (e.g., a barista calling your name, a train passing by).

To solve these and other problems with the conventional technology, in accordance with one aspect of the embodiments described herein, there are provided systems and methods for implementing personal "chameleon" camera that adapts to its surroundings, both co-located and remote. An exemplary operating sequence of the described personal "chameleon" camera is illustrated in FIG. 2.

In one or more embodiments, the described techniques implemented in the aforesaid smart camera first learn the face of the user (step 201 in FIG. 2), identify the camera user's face and pose in real time (step 202 in FIG. 2) and perform real-time removal (step 203) and replacement (step 204 in FIG. 2) of the user's background with the other party's background. This results in an improved immersive conference experience for the video conference participants.

One described embodiment further identifies and modifies certain reflective areas in the video, such as eyeglasses, mirrors, etc. and performs real-time modification of the identified reflective areas in the video to obfuscate potentially confidential information, remove glair and/or create the sense of presence for the video conference participant by inserting reflection of such participant's surroundings in the reflective areas detected in the received video stream in real time, see step 205 in FIG. 2.

Yet additionally, one or more embodiments detect various facial features of the user in the live video stream, such as user's lips. In addition, the pose of user's head is also detected. Based on the results of such detection, the system is configured to automatically mute and unmute the user's microphone based on the user's detected lip motion and head orientation. This is done such that the system does not register external noises and only captures sound when the user is actually speaking. As would be appreciated by persons of ordinary skill in the art, such feature is advantageous because it reduces the distraction of the other video conference participants.

In one or more embodiments, by replacing the background of the user's live video stream with the background that is similar to the surroundings of the other party on the video conference call, including replacing the reflective area of one's screen by the reflection of the other person's stream (either their face or what is being shared currently, e.g., a screen sharing session), the described embodiments also immerse all parties the same environment and without distracting elements, enhancing co-presence.

Figure 3A:
FIGS. 3a, 3b, 3c, 3d and 3e illustrate exemplary image processing results by an embodiment of the inventive "chameleon" smart camera that adapts to its surroundings, both co-located and remote.

FIGS. 3a, 3b, 3c, 3d and 3e illustrate an exemplary video stream processing results by an embodiment of the inventive "chameleon" smart camera that adapts to its surroundings, both co-located and remote. FIG. 3a shows the original video stream.

In one or more embodiments, the described smart camera system detects user's face and face orientation in the live video stream. In one embodiment, the described system uses FaceAPI or jeelizFaceFilter face detection software, well known in the art. The aforesaid software systems perform keypoint detection in the live video stream identifying keypoints on the user's face. The face detection and recognition is subsequently performed using the detected keypoints.

Figure 3B:
Figure 3C:
Figure 3D:
Figure 3E:

Once the face area of the user is detected, an embodiment of the described camera system separates the user's face and upper body in the video stream from the remaining area of the video, which is labeled as the background. The detected face and upper body of the person separated from the background are shown in FIG. 3b. In one embodiment, the system then in-paints the non-person area (the background of the video) with the background (surroundings) from the other conference participant, as illustrated in FIG. 3c.

In one or more embodiments, the system is configured to detect the face of a specific user, who initiated the web conference. To this end, the system performs face learning operation on the user in front of the smart camera when the video conference is initiated. In an alternative embodiment, the system may be configured to learn the face of the user beforehand when installing or configuring the system, as it is done with modern smartphones. After the face learning procedure, the system performs face recognition operation in the live video stream using the information obtained at the face learning stage.

In one or more embodiments, if some other person enters the field of view of the described smart camera, his or her image will also be removed, together with the background, in order to avoid creating distractions for other conference participants. For example, if a spouse or a child get in the camera view, the system would automatically remove their faces together with the user's background in order to avoid creating a distraction for other video conference participants.

As it is well known in the art, participants in video conferences often refer to objects outside of the field of view of the cameras they are using, which can lead to breakdowns in conversations, see S. Song, A Zeng, A X. Chang, M. Savva, S. Savarese, and T. Funkhouser. "1m2Pan0o3D: Extrapolating 360 Structure and Semantics Beyond the Field of View." CVPR. 2018. To address this, one embodiment of the described camera utilizes 360-degree cameras to insert participants into more complete representations of the remote scene.

In one or more embodiments, the other party's background in the video can be replaced with the front view of the user's environment to give more immersive experience. This can be done by using a separate camera (built-in the user's device or another device such as a smartphone) to capture the front view while the other camera is pointing to the user for the video conference.

Because the built-in front camera may not be steerable and/or the laptop screen may be opened at a bad angle, an initial video sequence of the front view could be recorded before the conference starts. With this pre-conference front-view recording, users facing a wall can momentarily position their front camera to look at a more interesting content.

In one or more embodiments, the system is additionally configured to utilize 360-degree cameras to help reconstruct the front view of the user's environment. In this implementation, indoor scene images can be collected by a 360-degree video camera of several different places such as cafes, restaurants, offices etc. These images can be stored in a remote database in order to store and retrieve full, 360-degree panoramic views of each indoor scene. This 360-degree panoramic view can be further processed to find the most similar part of it to the query image (i.e., the user's background). The contents in the opposite direction of the most similar part in the panoramic view can then be used as the background.

An alternative embodiment uses a deep learning based generative model described, for example, in A Radford, L. Metz, S. Chintala "Unsupervised Representation Learning with Deep Convolutional Generative Adversarial Networks," arXiv:1511.06434 [cs.LG] and P. Isola, J. Zhu, T. Zhou, A A Efros "Image-to-Image Translation with Conditional Adversarial Networks," arXiv: 1611.07004 [cs.CV] to generate a visually plausible front view of the user's environment given the background view in the user's video frame. The aforesaid model can be trained with a sufficient amount of collected indoor scene images (in the form of 360-degree panoramic representation) to learn the prior contextual information about the room layouts, and possible indoor objects such as tables, windows.

As would be appreciated by persons of ordinary skill in the art, about 64% of American adults wear glasses. This percentage among computer-related workers is even higher. As such, reflections in glasses are often noticed in the live video stream during laptop and smartphone-supported conferencing. Presence of such reflections in the live conferencing stream has several downsides. A first downside is privacy: reflected material could potentially be analyzed to extract intellectual property, as web camera resolution increases (especially in smartphones). Secondly, then aforesaid reflection presents a distraction and, consequently, a compromised user experience for the other party on the conference. To solve both of the above problems, one embodiment of the invention replaces the reflective area with a darker version that preserves the eyes behind, see FIGS. 3d and 3e. In one embodiment, the invention is also configured to add a new reflection using the other party's stream, making the other party feel more connected (as if we were looking at each other).

Figure 4:
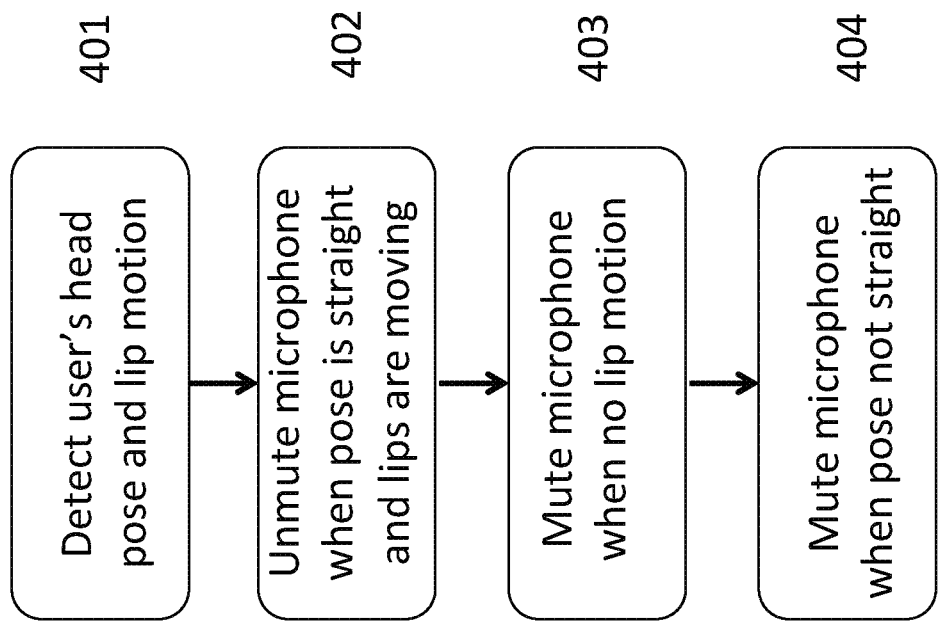
FIG. 4 illustrates an exemplary operating sequence of an embodiment of the inventive "chameleon" smart camera that is configured to automatically mute or unmute the microphone based on the pose of the user's head and user's detected lip motion.

In one embodiment, the described camera is configured to automatically mute or unmute the microphone based on the pose of the user's head and user's detected lip motion. FIG. 4 illustrates an exemplary operating sequence of an embodiment of the inventive "chameleon" smart camera that is configured to automatically mute or unmute the microphone based on the pose of the user's head and user's detected lip motion. The system detects user's head pose and lip motion is step 401.

In one embodiment, when the user's face is straight on (not left or right) and the user's lips are moving, the microphone is un-muted (unless it had been forced-mute by the user), see step 402. If the user's head faces directions other than a straight on pose (within a predetermined margin or threshold), the microphone mutes again: this accommodates the fact that the user might be talking to someone else (e.g., a barista approaching and engaging the user), see step 404. Likewise, if user's lips stop moving, the microphone is similarly muted, see step 403.

Exemplary Embodiment of a Computer System

Figure 5:
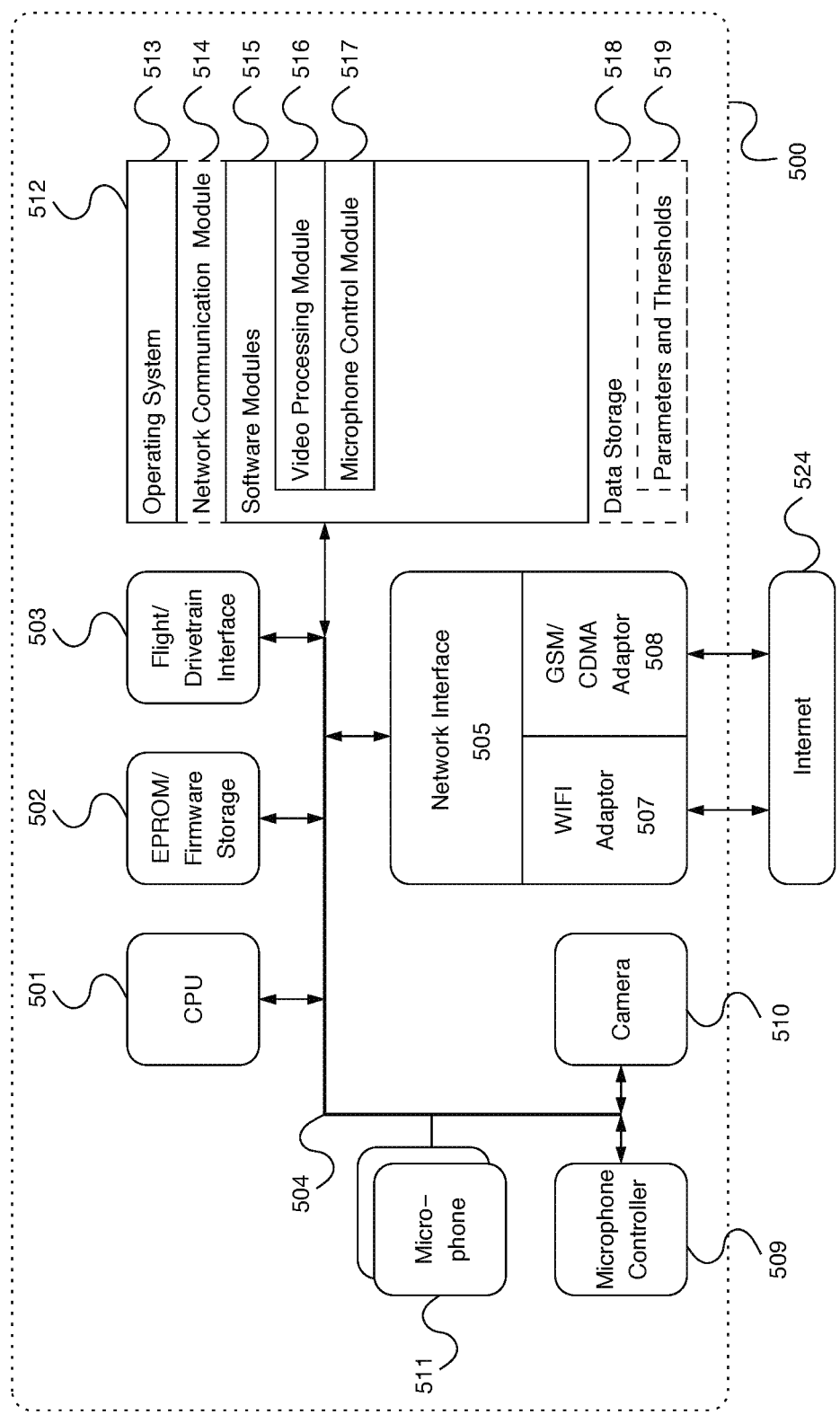
FIG. 5 illustrates an exemplary embodiment of a computer system, which may be used to implement the inventive techniques described herein.

FIG. 5 illustrates an exemplary embodiment of a computer system 500, which may be used to implement the techniques described herein. In one or more embodiments, the computer 500 may be implemented within the form factor of a mobile computing device well known to persons of skill in the art. In an alternative embodiment, the computer 500 may be implemented based on a laptop or a notebook computer. Yet in an alternative embodiment, the computer 500 may be a specialized computing system.

The computer 500 may include a data bus 504 or other interconnect or communication mechanism for communicating information across and among various hardware components of the computer 500, and a central processing unit (CPU or simply processor) 501 coupled with the data bus 504 for processing information and performing other computational and control tasks. The computer 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, computer 500 may further include a read only memory (ROM or EPROM) 502 or other static storage device coupled to the data bus 504 for storing static information and instructions for the processor 501, such as firmware necessary for the operation of the computer 500, basic input-output system (BIOS), as well as various configuration parameters of the computer 500.

In one or more embodiments, the computer 500 may additionally incorporate camera 510 for acquiring still images as well as the real-time video. In addition, the computer 500 may incorporate a microphone 511 for picking up the audio as well as a microphone control module 509 for automatically muting and un-muting the microphone 511 based on user's head pose.

In one or more embodiments, the computer 500 may additionally include a communication interface, such as a network interface 505 coupled to the data bus 504. The network interface 505 may be configured to establish a connection between the computer 500 and the Internet 524 using at least one of WIFI interface 507 and the cellular network (GSM or CDMA) adaptor 508. The network interface 505 may be configured to provide a two-way data communication between the computer 500 and the Internet 524. The WIFI interface 507 may operate in compliance with 802.11a, 802.11 b, 802.11g and/or 802.11 n protocols as well as Bluetooth protocol well known to persons of ordinary skill in the art. In an exemplary implementation, the WIFI interface 507 and the cellular network (GSM or CDMA) adaptor 508 send and receive electrical or electromagnetic signals that carry digital data streams representing various types of information.

In one or more embodiments, the Internet 524 typically provides data communication through one or more subnetworks to other network resources. Thus, the computer 500 is capable of accessing a variety of network resources located anywhere on the Internet 524, such as remote media servers, web servers, other content servers as well as other network data storage resources. In one or more embodiments, the computer 500 is configured send and receive messages, media and other data, including application program code, through a variety of network(s) including Internet 524 by means of the network interface 505. In the Internet example, when the computer 500 acts as a network client, it may request code or data for an application program executing in the computer 500. Similarly, it may send various data or computer code to other network resources.

In one or more embodiments, the functionality described herein is implemented by the computer 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other non-transitory medium from which a computer can read. Various forms of computer readable media may be involved in carrying one or more sequences of one or more instructions to processor 501 for execution. For example, the instructions may initially be carried on a magnetic disk from a remote computer. Alternatively, a remote computer can load the instructions into its dynamic memory and send the instructions over the Internet 524. Specifically, the computer instructions may be downloaded into the memory 512 of the computer 500 from the foresaid remote computer via the Internet 4 using a variety of network data communication protocols well known in the art.

In one or more embodiments, the memory 512 of the computer 500 may store any of the following software programs, applications and/or modules:

1. Operating system (OS) 513, which may be a mobile operating system for implementing basic system services and managing various hardware components of the computer 500. Exemplary embodiments of the operating system 513 are well known to persons of skill in the art, and may include any now known or later developed mobile operating systems. Additionally provided may be a network communication module 514 for enabling network communications using the network interface 505.

2. Software modules 515 may include, for example, a set of software modules executed by the processor 501 of the computer 500, which cause the computer 500 to perform certain predetermined functions, such as process camera video stream in real time using video processing module 516 and mute or un-mote microphone using a microphone control module 517.

3. Data storage 518 may be used, for example, for storing various parameters and thresholds 519.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, CIC++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for implementing personal "chameleon" smart camera that adapts to its surroundings, both co-located and remote. It is intended that the specification and examples be considered as exemplary only, with a true scope and spirit of the invention being indicated by the following claims.

The invention claimed is:

1. A computerized system comprising a processing unit and a memory, the system operating in connection with a real-time video conference stream containing a video of a user, wherein the memory embodies a set of computer-executable instructions, which cause the computerized system to perform a method comprising:
   a. receiving the real time video conference stream containing the video of the user;
   b. finding and separating a reflection in the received real time video conference stream; and
   c. modifying the separated reflection in the received real time video conference stream by replacing the separated reflection with a new reflection using a video conference stream of a second user.

2. The system of claim 1, wherein the modifying the separated reflection comprises darkening the separated reflection.

3. The system of claim 1, wherein the separated reflection is eye glasses of the user.

4. A method for operating a system in connection with a real-time video conference stream containing a video of a user comprising:
   a. receiving the real time video conference stream containing the video of the user;
   b. finding and separating a reflection in the received real time video conference stream; and
   c. modifying the separated reflection in the received real time video conference stream by replacing the separated reflection with a new reflection using a video conference stream of a second user.

5. The method of claim 4, wherein the modifying the separated reflection comprises darkening the separated reflection.

6. The method of claim 4, wherein the separated reflection is eye glasses of the user.

7. A non-transitory computer readable medium, storing instructions for executing a process for in connection with a real-time video conference stream containing a video of a user, the instructions comprising:
   a. receiving the real time video conference stream containing the video of the user;
   b. finding and separating a reflection in the received real time video conference stream; and
   c. modifying the separated reflection in the received real time video conference stream by replacing the separated reflection with a new reflection using a video conference stream of a second user.

8. The non-transitory computer readable medium of claim 7, wherein the modifying the separated reflection comprises darkening the separated reflection.

9. The non-transitory computer readable medium of claim 7, wherein the separated reflection is eye glasses of the user.

* * * * *